Feb. 27, 1923.
C. T. SMALL
1,446,591
CAP FEEDING MACHINE
Filed Sept. 27, 1920
2 sheets-sheet 1
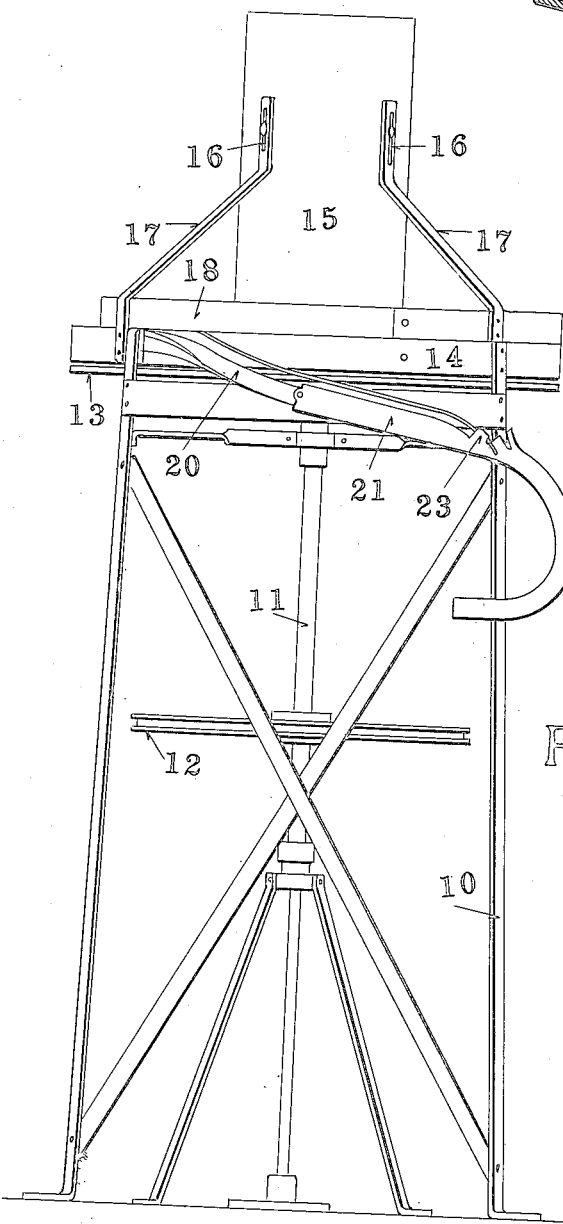
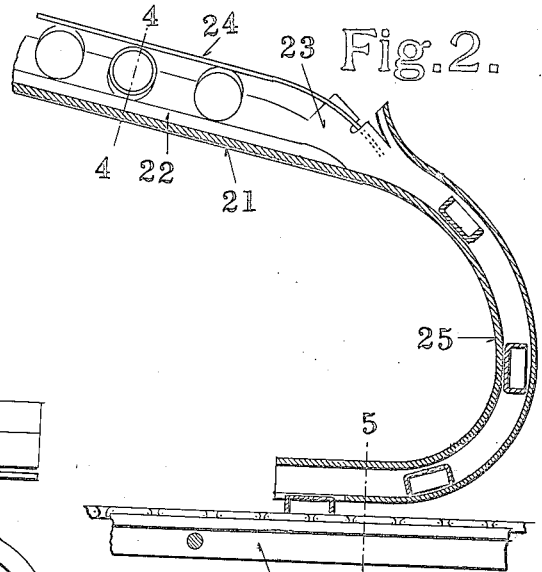
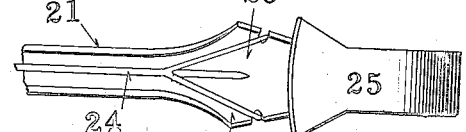
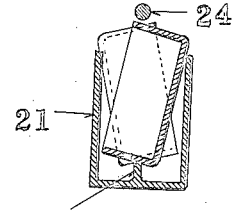
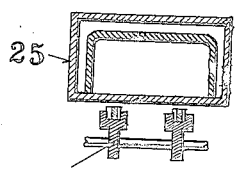
INVENTOR
C. T. SMALL
ATTORNEY

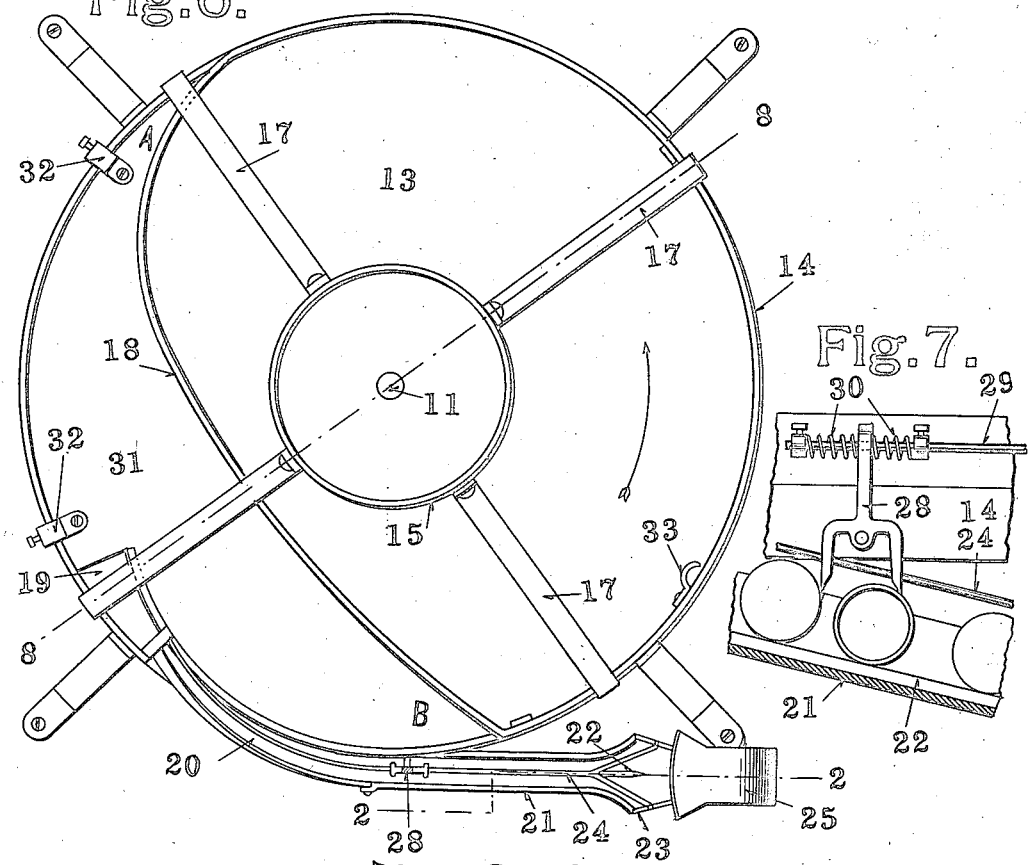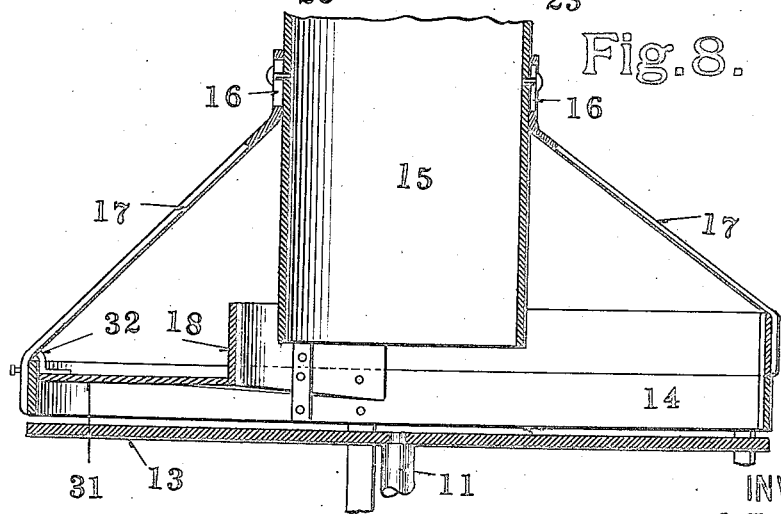

Patented Feb. 27, 1923.

1,446,591

UNITED STATES PATENT OFFICE.

CHESLEY T. SMALL, OF ST. LOUIS, MISSOURI, ASSIGNOR TO FIRST NATIONAL BANK IN ST. LOUIS, OF ST. LOUIS, MISSOURI.

CAP-FEEDING MACHINE.

Application filed September 27, 1920. Serial No. 413,189.

*To all whom it may concern:*

Be it known that I, CHESLEY T. SMALL, a citizen of the United States of America, residing at the city of St. Louis, State of Missouri, United States of America, have invented a certain new and useful Cap-Feeding Machine, of which the following is such a full, clear, and exact description as will enable anyone skilled in the art to which it appertains to make and use the same, reference being had to the accompanying drawings, forming part of this specification.

My invention relates to a cap feeding machine and particularly to a machine for feeding cylindrical caps of the form usually known as slip-covers to can capping machines.

Heretofore it has been usual to position slip-covers on the conveyors of the can capping machine by hand in order to secure the proper position of the caps with their flanges extending in the same direction. The object of my invention is to provide a simple and effective machine for rapidly positioning the caps on the conveyor of the can feeding machine without any manual manipulations.

In the accompanying drawings which illustrate one form of machine made in accordance with my invention, Fig. 1 is a side elevation. Fig. 2 is an enlarged section taken on the line 2—2 of Fig. 6. Fig. 3 is a top plan view of the parts shown in Fig. 2. Fig. 4 is a section taken on the line 4—4 of Fig. 2. Fig. 5 is a section taken on the line 5—5 of Fig. 2. Fig. 6 is a top plan view. Fig. 7 is an enlarged detail, partly in section, showing the feed controlling mechanism, and Fig. 8 is a section taken on the line 8—8 of Fig. 6.

10 indicates the support or frame work of the machine in which is journaled a vertical shaft 11 driven by any suitable means, such as the band wheel 12, in the direction indicated by the arrow in Fig. 6. Rigidly mounted on the upper end of shaft 11 is a disc 13 forming a rotary support for the caps. 14 is an annular member forming side walls positioned above disc 13 for retaining the caps and guiding them to the outlet. Caps are delivered on the disc 13 through a central conduit 15 to which the caps may be supplied from a suitable hopper. The conduit 15 is adjustable toward and away from the disc 13 to regulate the flow of caps by means of slots 16 formed in the supporting arm 17 carrying the said conduit. 18 is a partition situated between the lower end of the conduit 15 and the cap outlet 19 (Fig. 6). This partition 18 is arranged at such a distance from the disc 13 as to allow single caps to pass freely below it, but to prevent the passage of two or more caps piled on top of one another. The rotation of the disc 13 thus carries single caps to the outlet 19, the caps being forced against the circular member 14 by centrifugal action and guided thereby to the outlet. Extending outwardly from the partition 18 to the band 14 is a cover plate 31 held in position by clamps 32, which may be two or more in number. The cover plate 31 is not parallel with the disc 13 but is slightly inclined being lower at the end A than at the end B. The cover plate 31 prevents the caps from piling one on top of another in the space enclosed by it, and by its inclined position prevents the caps from becoming wedged in this space. A projection 33 forces the caps inwardly thus preventing them from forming in a closed circle around the periphery of the disc.

As the caps pass out through the opening 19 they enter a chute, the first portion 20 of which is twisted through an angle of ninety (90) degrees so as to bring the caps on edge when they enter the second portion 21 of the chute. This portion 21 of the chute is slightly greater in width than the thickness of the cap but less than its diameter so that the cap is maintained on edge as best shown in Fig. 4. This portion 21 of the chute is provided on its bottom with a ridge 22 at the termination of which the chute is expanded laterally at 23, as best shown in Fig. 3, so as to allow the caps to assume a horizontal position. A guard wire 24 extends above the open portions 20 and 21 of the chute to prevent the caps from jumping out of these parts. The guard is preferably provided with a bifurcated end as shown in Figure 3 which end engages suitable notches in the upper edge of the laterally expanded part of the chute. The caps will be moved by gravity to one side or other of the chute as shown in Fig. 4 owing to the greater weight of the closed side of the cap. When they assume the horizontal position at the expanded portion 23 they will be positioned with their flanges extending upwardly. A third part 25 of the chute forms a return bend to reverse the caps so that they will be positioned on the conveyor 26 with their flanges extending downwardly.

It is desirable to feed the caps onto the conveyor 26 at a rate commensurate with the speed of the capping machine. In order to accomplish this result, I provide the device with a feed controlling mechanism, one form of which is shown in Figs. 6 and 7 of the drawing. This feed mechanism consists of a forked member 28 pivoted to the wall 14 and projecting into the central portion 21 of the chute. The member 28 is operated by a rod 29 actuated from the capping machine. Springs 30 are preferably interposed between the rod 29 and the member 28.

Having fully described my invention what I claim as new and desire to secure by Letters Patent of the United States is:

1. In a device of the class described, the combination with a chute, of a rotary horizontal support for delivering caps to said chute, said chute comprising a spiral of substantially ninety degrees to position the caps on edge, and gravity operated means for turning the caps to the right or left to position them with their flanges in the same direction.

2. In a device of the class described, the combination with a chute, of a rotary horizontal support for delivering caps to said chute, said chute comprising a spiral of substantially ninety degrees to position the caps on edge, and gravity operated means for turning the caps to the right or left to position them with their flanges extending upwardly, and a guard extending above the chute to prevent the escape of the caps but to allow inspection thereof.

3. In a device of the class described, a chute adapted to receive caps on edge, the width of said chute being greater than the thickness of the caps but less than their diameter, said chute being provided with a central ridge and a laterally expanded portion for positioning the caps horizontally by gravity with their flanges extending in the same direction, and a guard extending above the chute to prevent the escape of the caps but to allow inspection thereof, said guard being provided with a bifurcated end above the laterally expanded portion.

4. In a device of the class described, the combination with said walls and a rotary horizontal support for the caps, of a partition spaced from said support to allow the passage of single caps, a cover plate extending from said partition to the adjacent side walls, cap delivering means arranged at one side of said partition, and a cap discharge arranged at the other side of said partition.

5. In a device of the class described, the combination with side walls and a rotary horizontal support for the caps, of a partition spaced from said support to allow passage of said caps, a longitudinally inclined cover plate extending from said partition to the adjacent walls, cap delivering means arranged at one side of said partition, and a cap discharge arranged at the other side of said partition.

6. In a device of the class described, the combination with side walls and a rotary horizontal support for the caps, of a cover plate arranged adjacent to one portion of the side walls and forming a chamber of reduced height open along its inner periphery, and a partition extending upwardly from the inner edge of said cover plate.

7. In a device of the class described, the combination with a rotary horizontal support for delivering caps through a peripheral outlet, of a chute for receiving the caps on edge, gravity operated means for turning the caps to the right or left to position them with their flanges extending upwardly, and automatic feed regulating means situated between the outlet and said gravity turning means.

In testimony whereof, I have hereunto set my hand and affixed my seal.

CHESLEY T. SMALL. [L. S.]